March 3, 1931.  J. LEDWINKA  1,794,465
AUTOMOBILE BODY
Filed Oct. 17, 1923  10 Sheets-Sheet 1
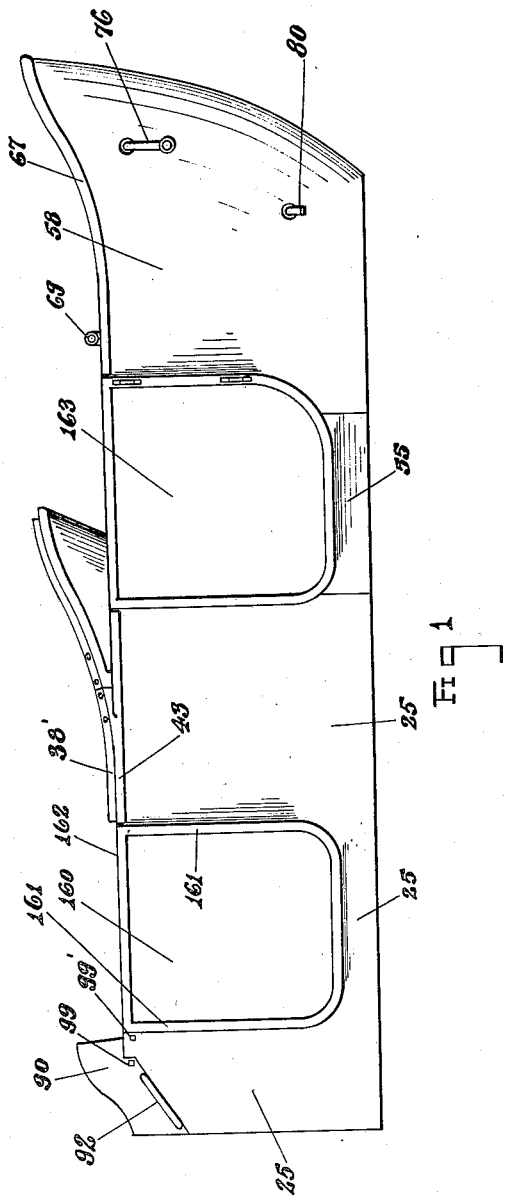
INVENTOR.
JOSEPH LEDWINKA.

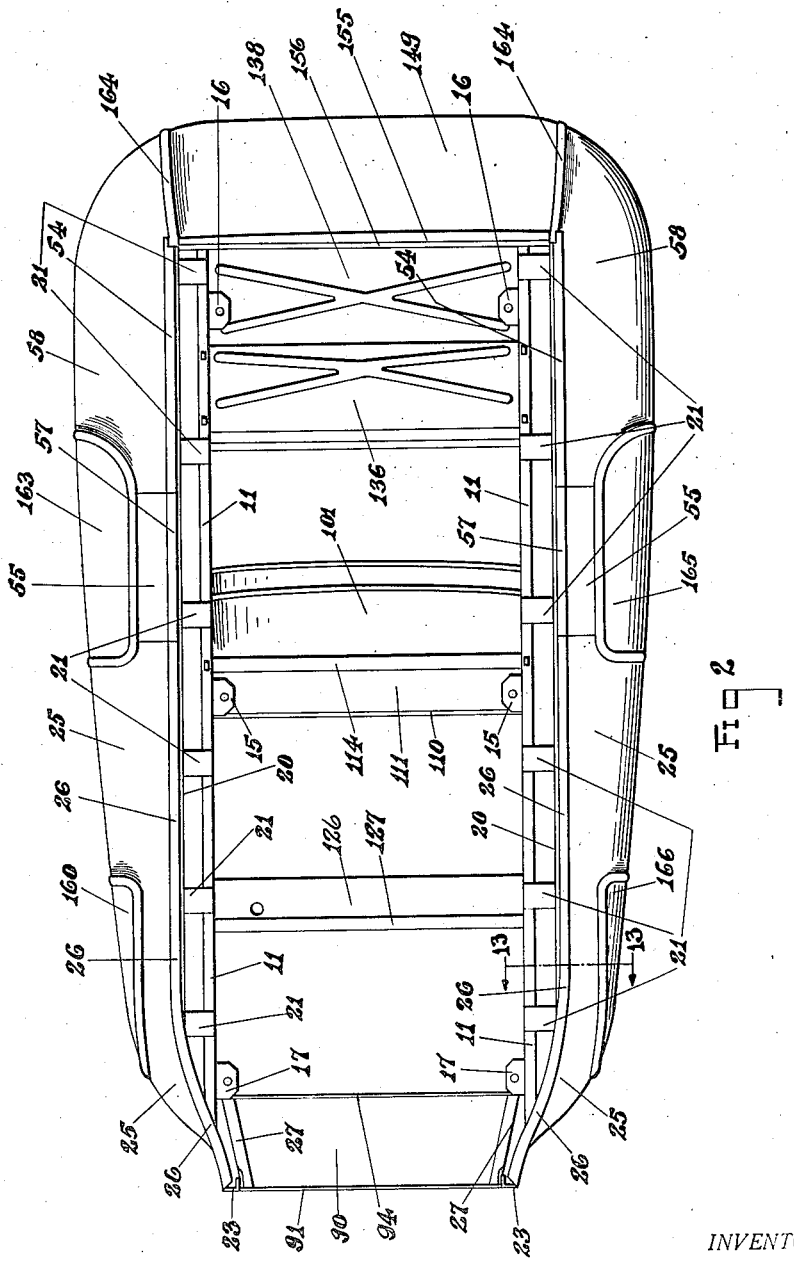

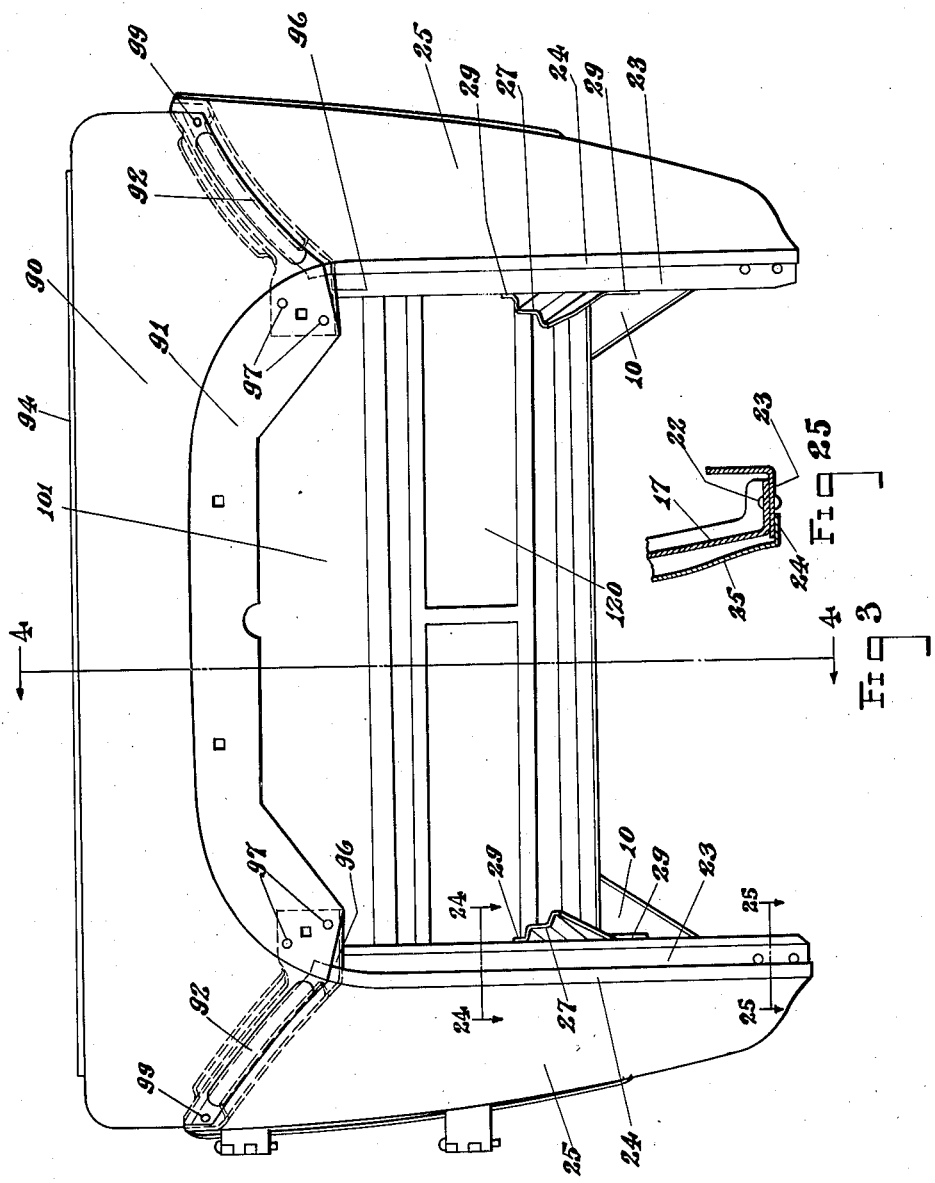

March 3, 1931.  J. LEDWINKA  1,794,465
AUTOMOBILE BODY
Filed Oct. 17, 1923   10 Sheets-Sheet 4
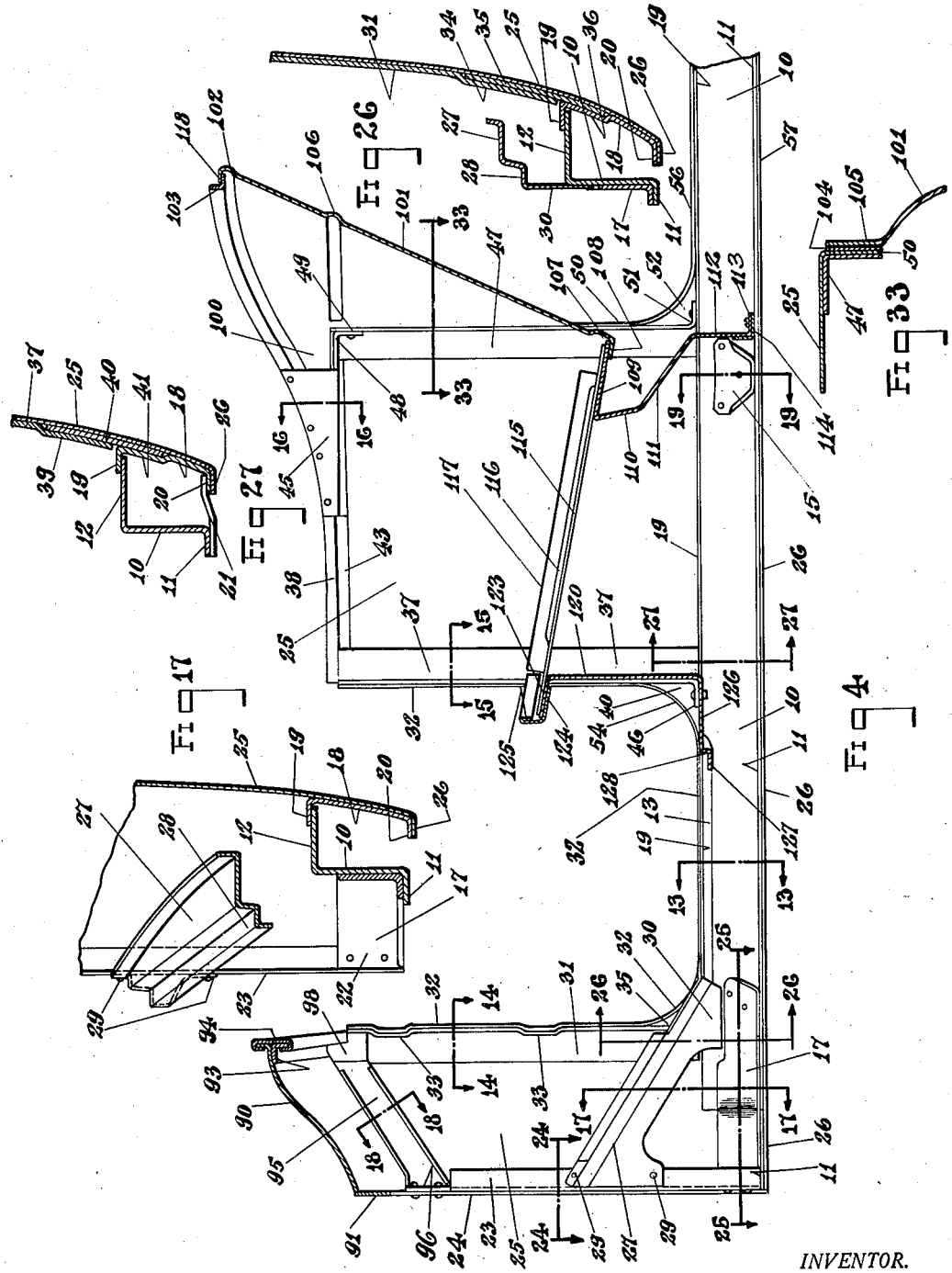
INVENTOR.
JOSEPH LEDWINKA.
BY
ATTORNEY
WITNESS:—
Walter M. Trout

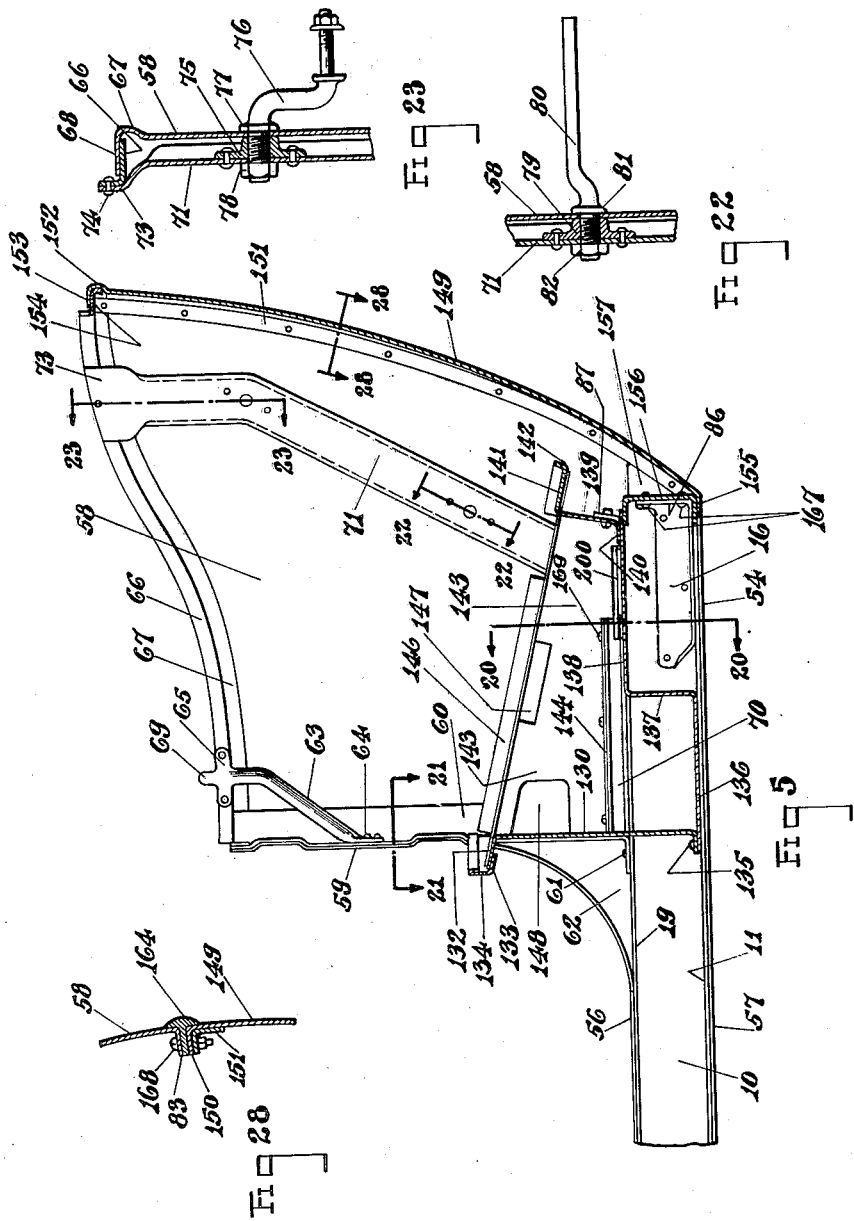

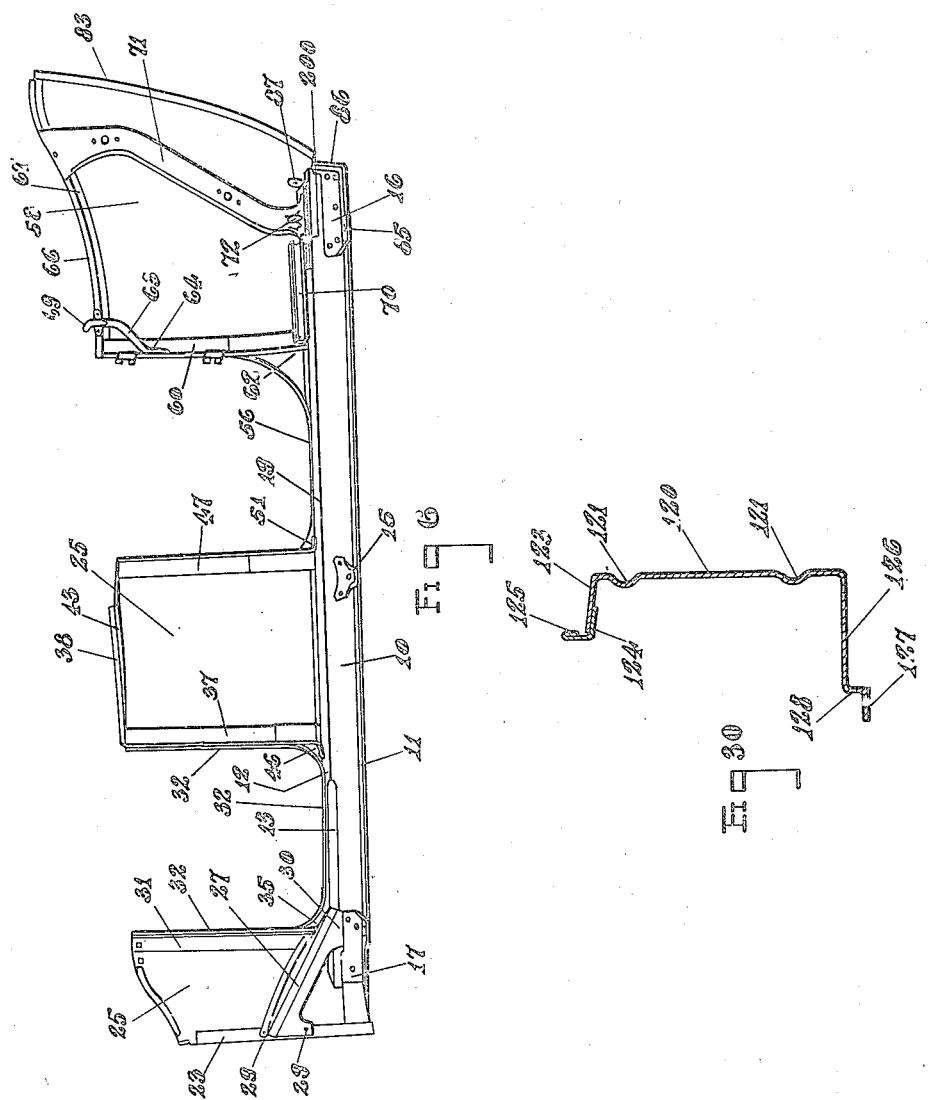

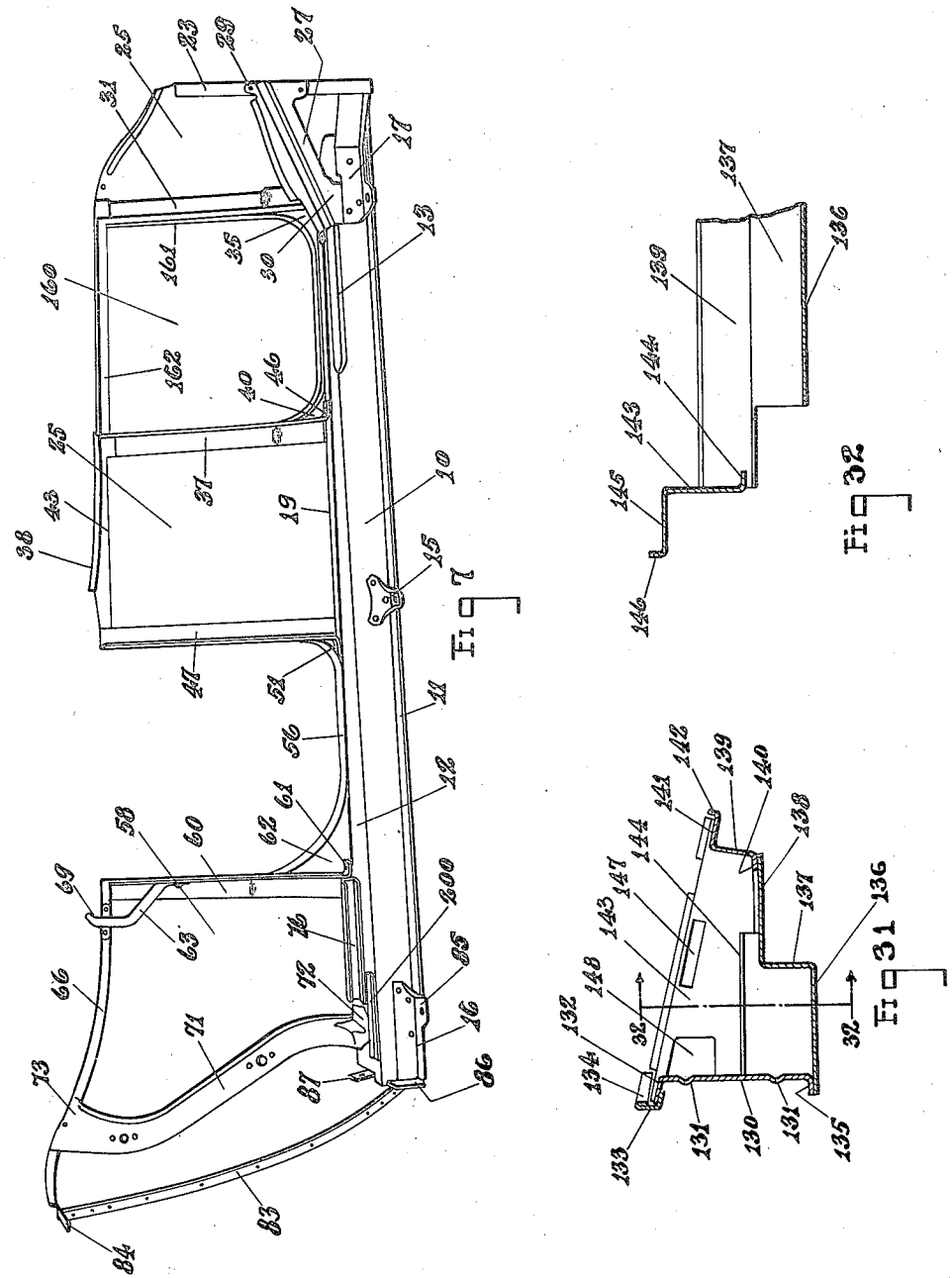

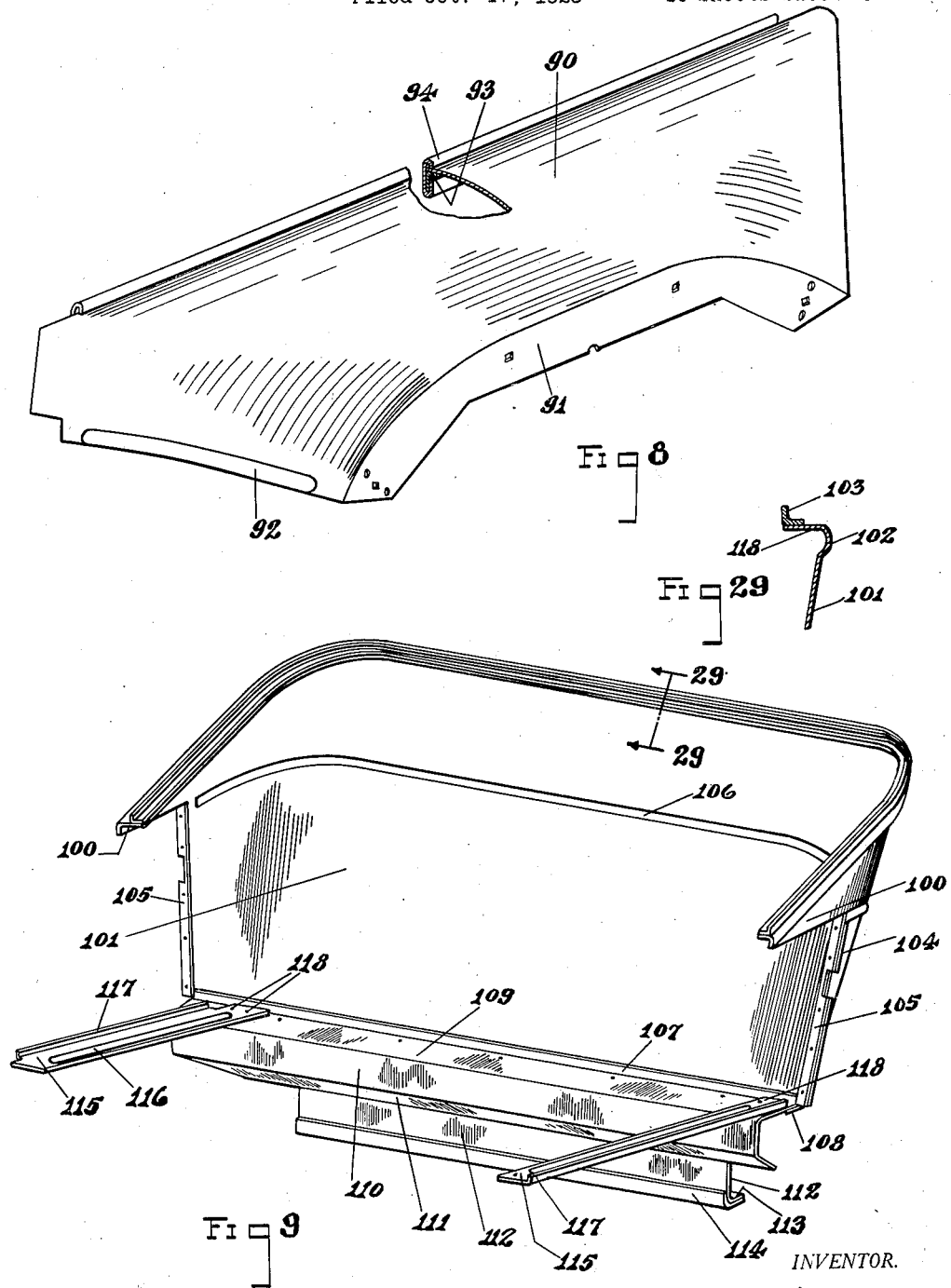

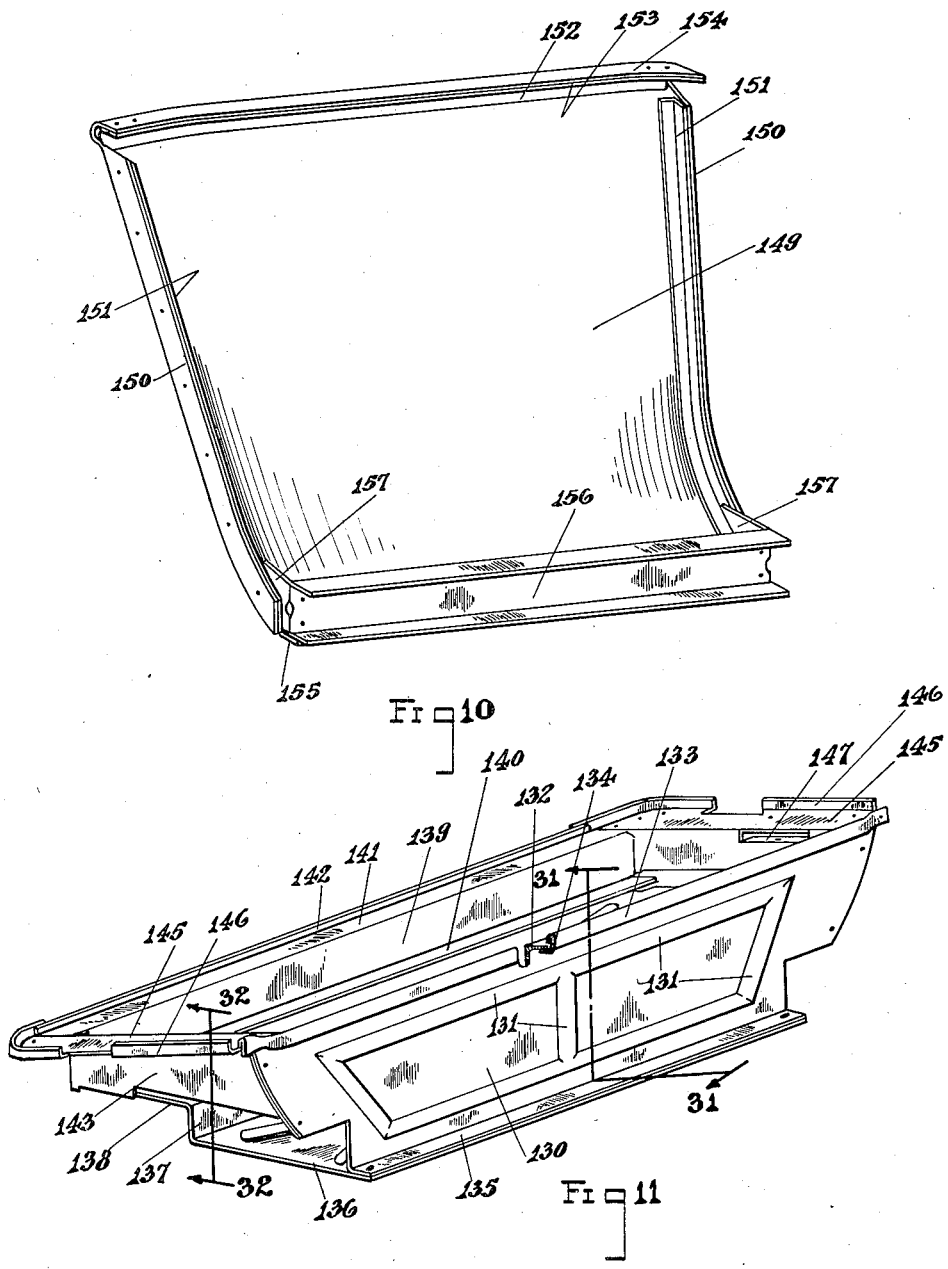

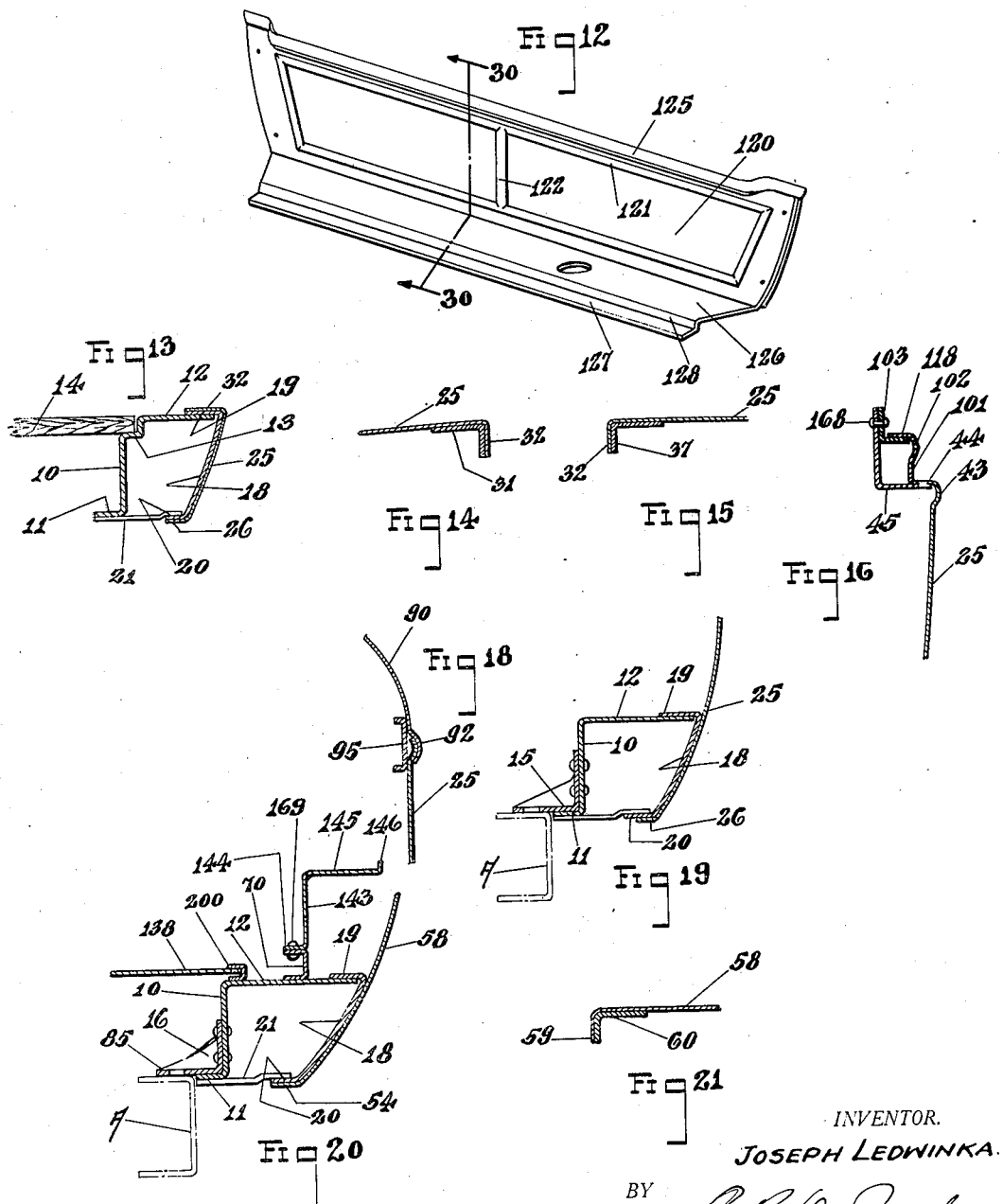

Patented Mar. 3, 1931

1,794,465

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AUTOMOBILE BODY

Application filed October 17, 1923. Serial No. 669,089.

My invention relates to improvements in automobile bodies and has to do, more particularly, with automobile bodies constructed entirely of metal.

The chief object of my invention is to provide an automobile body which is strong and durable, light in weight and can be manufactured at a comparatively low cost.

Another object of my invention is to provide an automobile body which is made up by the assembly of independently assembled body units, which can be constructed independently of each other at the body-manufacturing plant, so that the body can be completed by the final assembly of such units, either in the body plant, the automobile manufacturing plant, or at some other assembly point.

A further object of my invention is to provide an automobile body which is made up of independently assembled body units of such a nature that they are substantially flat, so that they can be packed very compactly in a freight car for shipment with the result that bodies can be shipped in the knock-down condition with greatly reduced transportation charges.

A further object of my invention is to provide an automobile body having an improved metal sill construction which is strong, yet light and inexpensive to manufacture.

A further object of my invention is to provide an improved cowl construction which is constructed entirely of metal and formed by the assembly of the top panel with forward portions of the body side units.

A further object of my invention is to provide an automobile body having an improved cowl construction which, although inexpensive, is particularly strong.

A further object of my invention is to provide an automobile body constructed entirely of metal and having an improved door post construction, which is strong and durable but light and inexpensive.

A further object of my invention is to provide an automobile body constructed entirely of metal and having an improved brace for supporting the top and fender irons.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawings, forming a part of this specification, in which:

Fig. 1 is a view, in side elevation, of a touring car body constructed in accordance with my invention.

Fig. 2 is a bottom plan view of the body.

Fig. 3 is a view of the body in front elevation.

Fig. 4 is a longitudinal, vertical, sectional view through the forward portion of the body, taken on the line 4—4 of Fig. 3.

Fig. 5 is a similar longitudinal, vertical, sectional view through the rear portion of the body.

Fig. 6 is a view, in side elevation, of the side unit for the right hand side of the body.

Fig. 7 is a similar view of the side unit for the left hand side of the body.

Fig. 8 is a perspective view of the unit forming the top of the cowl.

Fig. 9 is a perspective view of the front seat unit.

Fig. 10 is a perspective view of the unit forming the rear of the tonneau.

Fig. 11 is a perspective view of the rear seat unit.

Fig. 12 is a perspective view of the front heelboard unit.

Fig. 13 is a detail, sectional view through one of the sills, at the front door opening, taken on the line 13—13 of Figs. 2 and 4.

Fig. 14 is a detail, sectional view through one of the door posts, taken on the line 14—14 of Fig. 4.

Fig. 15 is a detail, sectional view through the door post at the rear of the front door opening, taken on the line 15—15 of Fig. 4.

Fig. 16 is a detail, sectional view, taken on the line 16—16 of Fig. 4 and showing the connection between the side units and the front seat unit.

Fig. 17 is a detail, sectional view through the forward end of the body sill and one of the toeboard supports, taken on the line 17—17 of Fig. 4.

Fig. 18 is a detail, sectional view, taken on the line 18—18 of Fig. 4, showing the connection between the unit forming the top of the cowl and the side units.

Fig. 19 is a detail, sectional view, taken on the line 19—19 of Fig. 4, and showing one of the brackets for attaching the body to the chassis frame.

Fig. 20 is a detail, sectional view through the rear seat of the body, taken on the line 20—20 of Fig. 5.

Fig. 21 is a detail, sectional view through the door post at the rear of the rear door opening, taken on the line 21—21 of Fig. 5.

Figs. 22 and 23 are detail, sectional views, taken on the lines 22—22 and 23—23 of Fig. 5, and showing the brace for supporting the top and fender irons.

Fig. 24 is a detail, sectional view through the forward portion of the cowl, taken on the line 24—24 of Figs. 3 and 4.

Fig. 25 is a detail, sectional view, showing the connection between the cowl and the forward end of the body sill, and taken on the line 25—25 of Figs. 3 and 4.

Fig. 26 is a detail, sectional view, showing the connection of the door posts at the forward edge of the front door opening to the body sills, and taken on the line 26—26 of Fig. 4.

Fig. 27 is a similar view, taken on the line 27—27 of Fig. 4.

Fig. 28 is a detail, sectional view, taken on the line 28—28 of Fig. 5, and showing the connection between the unit forming the rear of the tonneau and one of the side units.

Fig. 29 is a detail, sectional view, taken on the line 29—29 of Fig. 9, and showing the construction at the upper edge of the front seat unit.

Fig. 30 is a detail, sectional view through the front heelboard unit, taken on the line 30—30 of Fig. 12.

Fig. 31 is a detail, sectional view, taken on the line 31—31 of Fig. 11 showing the construction of the rear seat unit.

Fig. 32 is a detail, sectional view through the rear seat unit, taken on the line 32—32 of Figs. 11 and 31.

Fig. 33 is a detail, sectional view showing the connection between the front seat unit and the side units, and taken on the line 33—33 of Fig. 4.

In the drawings, the same reference numerals refer to the same parts throughout the several views and the sectional views are taken looking in the direction of the arrows at the ends of the section lines.

Heretofore, in the manufacture of automobile bodies constructed entirely of metal, it has been the practice, in some instances, to fabricate a number of body units which are fastened together, in the final assembly, to form the complete body. This results in a considerable economy of space and saving in cost of manufacture, and, when the body units are shipped to the plant of the automobile manufacturer and put through the final assembly there, a considerable saving in transportation charges results. The unit constructions heretofore employed in manufacturing all-metal bodies have been of two general types. For instance, in my pending application for Letters Patent for Automobile bodies and the method of making same, Serial No. 433,379, filed Dec. 27, 1920, I have shown an automobile body made entirely of metal parts and constructed by fastening together, at final assembly, a pair of side units, a cowl unit, a front seat unit, a rear seat unit and a tonneau unit. Also, in my pending application for Letters Patent for Automobile bodies and the method of making same, Serial No. 484,674, filed July 14, 1921, I have shown an all-metal automobile body constructed by connecting together, at final assembly, a front seat unit, a cowl unit and a tonneau unit. The use of units such as are shown in said pending applications results in considerable economy of space over prior practices but, nevertheless, several of the units are comparatively cumbersome and take up a great deal of space when compared with their weight. For instance, the cowl and tonneau units take up much space and it is difficult to pack many of them in a car when the units are shipped before assembly. It is the purpose of my present invention to provide an automobile body made entirely of metal and constructed by the assembly of a number of body units of such a character that much greater economy of space results than in the unit constructions heretofore employed for all-metal bodies. In particular, I propose to eliminate the space-consuming cowl and tonneau units and to make the sides of the cowl and tonneau part of the side units, the cowl and tonneau being formed by connecting, to the side units, panels forming the top of the cowl and the rear of the tonneau respectively.

In general, my invention consists of an automobile body which is constructed entirely of metal and made up of a number of independently assembled body units which are connected together in the final assembly to form the complete body. I accomplish the objects of my invention by the use of independently assembled body units of such character that the operations needed for connecting them together in the final assembly, are very simple and can be performed very rapidly and easily, so that, after these independently assembled body units have been manufactured, the construction of a complete body from them is a comparatively simple matter. I propose to use body units of such a character that they are substantially flat and of such shape that they can be shipped very compactly in a freight car, so that, if desired, these body units may be manufactured at the body plant and shipped to the automobile plant where the units are assembled to form a complete body. These units are specially constructed to effect economies in transportation and, to that end, I propose to use a pair of side units, each of which may include panels forming the side of the cowl and the side of the tonneau, a unit forming the top of the cowl, a unit forming the back of the tonneau, a front seat unit, a rear seat unit and a front heelboard unit. I propose to use independently assembled side units each of which may include one of the body sills, door posts rigidly connected thereto and the paneling forming the side of the body shell. The rear tonneau unit may include a cross member which connects the rear ends of the body sills. The rear portions of the side units may be connected to the unit forming the rear of the tonneau. The front seat unit may include the panel forming the back of the front seat and cross braces which also form the support for the front seat. This unit may be connected to intermediate portions of the respective side units. I also propose to use a unit constituting the heelboard for the front seat and such unit may be connected to the front seat unit and the side units. The rear seat unit may comprise a box-like structure for supporting the rear seat cushion, and I propose to connect this rear seat unit to the rear portions of the side units and to the unit forming the rear of the tonneau. The unit forming the top of the cowl may consist of a panel shaped to form the top portion of the cowl and flanged at suitable points to give it the necessary strength. This unit is to be connected to the side units at suitable points.

Another feature of my invention consists in an improved metal sill construction which is strong but light and economical to manufacture. I propose to use an angle bar which is straight from end to end and constitutes a girder extending longitudinally of the body and a channel bar which may be curved longitudinally and transversely to conform to the contour of the lower side portion of the body and to which the panels forming the side of the body may be fastened. The angle bar sill and the channel bar may be rigidly connected forming, substantially, a box girder.

Another feature of my invention is an improved door post construction which is particularly economical to manufacture. This is of especial importance in all-metal bodies which have door openings with curved corners. Heretofore, it has been customary to provide door posts which are curved to conform to the curved corner of the door opening, but, in accordance with my present invention, I propose to provide substantially straight angle members, forming the door posts and connected to the sills, and gusset plates connected to such angle members and the sills and having their edges curved to conform to the curved corners of the door openings. Certain of the features of my invention, it will be observed, may be employed in bodies which do not employ the unit construction herein described.

It is to be noted that the body disclosed in this specification comprises a skeleton frame made up of sheet metal stampings, which take the stresses and strains coming upon the body in use, and a shell made up of sheet metal panels shaped to give the required contour and external appearance to the body. The members forming parts of the shell and frame are interconnected so that the shell and frame parts mutually brace and reinforce each other. The units may each include parts of the skeleton frame and parts of the shell.

The body illustrated in the accompanying drawings constitutes one embodiment of my invention. Figs. 1 to 5 show the assembled body while Figs. 6 to 12 show the units which are to be assembled and fastened together to make the complete body. I will describe, first, the several units used to make up this body and, then, the assembly of these units to form the complete body.

The side units employed in this construction are illustrated in Figs. 6 and 7. These units are substantially alike, except that one is a right hand and the other a left hand unit. In the body which I have chosen to illustrate my invention, there is no front door opening at the left and, consequently, the left hand side unit has a panel covering this part of the side of the body, which, in the right hand unit, is a door opening. Each of these side units includes a longitudinally-extending angle bar, 10, which forms one of the body sills. This angle bar extends from the front to the rear of the body and is straight longitudinally so as to provide a straight sill construction such as is described and claimed in my pending applications, Serial Nos. 290,787 filed April 17, 1919, and 431,732 filed December 18, 1920. The angle bar, 10, is of Z-shaped cross section (see Figs. 13, 17, 19, 20, 26 and 27) having a flange, 11, at its lower edge, extending inwardly of the body and a flange, 12, at its upper edge, extending outwardly. At that portion of the angle bar, 10, which is adjacent the front door opening of the side unit, a portion of the upper flange of the angle bar may be depressed to form a shoulder, 13, in its upper surface, which receives the ends of the floor boards 14 (see Fig. 13). The brackets, 15, 16 and 17, are connected to the angle bar, 10, as shown in Figs. 17, 19 and 20, and provide a means for connecting the body to the side members, A, of the chassis frame of the automobile. The bracket, 15, is located on the central portion of the angle bar, 10, approximately in line with the rear edge of the front seat, the bracket, 16, is located at the rear end of the sill member, 10, and the bracket, 17 having a lateral extension 17' for securement to the chassis, is located at the front end of such sill member. The sill construction includes a pressed metal channel member, 18, which is curved both longitudinally and transversely to conform to the curvature or contour of the lower side portion of the body. The open side of channel member, 18, faces inwardly with respect to the body and its upper flange, 19, extends over and is rigidly secured, by welding or otherwise, to the upper flange, 12, of the angle member, 10. A series of reinforcing strips, 21, extend from the lower flange, 11, of the angle bar, 10, to the lower flange, 20, of the channel member, 18, and are rigidly secured to said flanges by welding or otherwise. This makes a very strong sill construction which is, essentially, a box girder. It is, however, a sill construction which can be manufactured very cheaply inasmuch as the angle member, 10, has no curved surfaces and does not require expensive dies to form it.

The bracket, 17, which is fastened to the forward end of the sill member, 10, has a portion extending laterally from its forward end, forming a foot, 22, which is rigidly secured, by rivets or otherwise, to one flange of an angle bar 23, which forms the forward end of the side unit and extends vertically. A sheet metal panel, 25, is secured to the body sill and the angle bar, 23, and forms that part of the body shell forming the side of the body from the front end of the body to the front edge of the rear door opening. In the case of the right hand side unit, the side panel, 25, is cut away to conform to the front door opening while, in the case of the left-hand side unit shown, the side panel, 25, has a portion, 160, extending across the space corresponding to the front door opening and beaded, as at 161 and 162, to simulate a door. The forward portion of the side panel, 25, forms the side portion of the cowl and the forward edge portion of said side panel is flanged inwardly, at 24, and rigidly secured, by welding or otherwise, to the flange of the angle bar, 23, (see Figs. 24 and 25). The lower edge portion of the side panel, 25, is applied externally to the channel member, 18, and is flanged inwardly, at 26, and rigidly secured by welding or otherwise to the lower flange, 20, of said channel member, (see Figs. 13, 17, 19, 26 and 27). The toeboard supports, 27, are pressed metal members of generally angular form, see Figs. 1, 17 and 26, having a vertically-extending arm provided with an inclined upper edge from which extends a laterally outwardly-extending arm, these supports having a ledge or shoulder 28 formed therein by a rabbet at the juncture of said vertically and laterally-extending arms. These toeboard supports are fastened to the respective side units with their upper edges in an inclined position so that the ledge or shoulder, 28, is positioned to receive and support the ends of the toeboards and has its lower end in line with shoulder, 13, of the sill so as to form a continuation thereof. The forward end of the toeboard support is rigidly secured, for instance, by means of the rivets, 29, to the rearwardly-extending flange of the angle bar, 23. The rear end of the toeboard support has an enlarged flange, 30, which is applied and rigidly secured, by welding or otherwise, to the side of the sill member, 10, (see Fig. 26). At the forward edge of the front door opening, there is a door post consisting of the angle member, 31, (see Fig. 14) which is rigidly secured to the sill. The connection between the sill and the door post, 31, is best shown in Fig. 26, from which it will be seen that the lower end of the door post is offset, at 34, and the channel member, 18, of the sill is also offset at the point of connection of the door post, so that a gusset plate, 35, may be inserted between the side panel, 25, and the door post, 31, and channel member, 18. The gusset plate, 35, acts as a splice-plate and is rigidly secured, by welding or otherwise, to the channel member, 18, and the door post, 31. The side panel, 25, is flanged inwardly, at 32, and rigidly secured to the inwardly-extending flange of the door post, 31. The door post flange may be offset, as at 33, to provide for the mounting of the door hinges. The same door post construction may be used in both side units, although in the left hand side unit illustrated, there is no door opening formed in the side panel and the flange, 32, is, consequently, omitted. Referring to Fig. 4, it will be seen that the lower part of the door post, 31, does not conform to the curved corner of the door opening. The door posts, 31, are substantially vertical and can, therefore, be made very cheaply. The edge of the gusset plate, 35, is cut to conform to the curved corner of the door opening and the flange, 32, of the side panel, 25, is applied to this curved edge of the gusset plate, 35, to form the curved corner of the door opening. At the bottom of the front door opening, the flange, 32, is applied and rigidly secured to the upper flange, 19, of the channel member, 18, as shown in Fig. 13.

At the rear edge of the front door opening, there is a door post, 37, formed by an angle member, as shown in Fig. 15. This door post, 37, is rigidly secured to the sill construction in substantially the same manner as the door post, 31, (see Fig. 27). The door post, 37, is offset at 39, and the channel member, 18, of the sill, is offset at 41, to receive the gusset plate, 40, which is rigidly secured to both the door post and the channel member, 18, and constitutes a splice-plate connecting said parts. The edge of this gusset plate, 40, is curved to conform to the curved corner of the door opening and the flange, 32, of the side panel, 25, is applied to this curved edge and then applied and rigidly secured to the flange of the door post, 37, as shown in Fig. 15. The inwardly-extending flange of the door post, 37, has, at its lower end, a foot, 46, which is bent back at right angles and may be rigidly secured by welding or otherwise, to the flange 19, of the sill channel member. Both side units are shown provided with a door post, 37, although, in the left-hand unit, there is no front door opening and the flange, 32, is omitted.

The upper edge of that portion of the side panel between the two door openings has a longitudinally-extending bead, 43, formed therein and a flange, 44, extending inwardly above the bead. The angle, 38, forming a garnish rail, is rigidly secured, by welding or otherwise, to this inturned flange. A door post, 47, is secured to the sill at the front edge of the rear door opening. This door post, 47, is an angle member, as shown in Fig. 33, and is secured to the sill construction in the same manner as the door post, 37. The gusset plate, 52, is rigidly secured, by welding or otherwise, to the channel member, 18, of the sill and the lower portion of the door post, 47, and constitutes a splice plate connecting such parts. The inwardly-extending flange of the angle bar, 47, is bent laterally forming a foot, 51, which is rigidly secured, by rivets or otherwise, to the flange 19, of the sill channel member, 18. The side panel, 25, is flanged inwardly, at 50, and rigidly secured to the inwardly-extending flange of the door post, 47, by welding or otherwise.

The portion of the body shell beneath the rear door opening is formed by a side panel, 55, having a lower flange, 57, which is applied externally to and rigidly secured to the lower flange, 20, of the sill channel member, 18, and an upper flange, 56, which is applied and rigidly secured to the upper flange, 19, of said channel. This flange, 56, is continued along the curved edge of the gusset plate, 52, which forms the lower forward corner of the rear door opening.

The side of the tonneau is formed by a sheet metal body panel, 58, having an inwardly-extending flange, 54, at its lower edge, which is applied externally and rigidly secured to the lower flange, 20, of the sill channel member, 18, (see Fig. 20). A door post, 60, of angle construction, as shown in Fig. 21, is rigidly secured to the sill construction, in the manner previously described, the gusset plate, 62, being rigidly connected both to the sill channel member, 18, and the door post, 60, and forming a splice-plate connecting such parts. The foot, 61, is bent laterally from the inwardly-extending flange of the door post, 60, and is secured, by rivets or otherwise, to the upper flange, 19, of the sill channel. The panel, 58, is flanged inwardly, at 59, and secured, by welding or otherwise, to the inwardly-extending flange of the door post, 60; the flange, 59, being carried down along the curved edge of the gusset plate, 62, so as to form the rear lower corner of the rear door opening. The inwardly-extending flange of the door post, 60, may be provided with suitable depressions to receive the door hinges.

A brace, 63, is secured, at 64, to the inwardly-extending flange of the door post, 60, and, at 65, to the angle bar, 66, forming a garnish rail at the top of the panel, 58, and said brace has a portion, 69, projecting over the top edge of the unit and forming a support for the body top. The upper edge of the panel, 58, is beaded, at 67, and has an inwardly-extending flange, 68, to which the garnish rail, 66, is secured, as shown in Fig. 23. The channel, 70, opening inwardly of the body, rests on its side on the flange, 12, of the sill member, 10, and is rigidly secured thereto, by welding or otherwise. A brace, 71, has a laterally-turned foot, 72, at its lower end, which is rigidly secured, by welding or otherwise, to the flange, 12, of the sill member 10. The upper end of this brace is offset slightly, at 73, and secured to the garnish rail, 66, by any suitable means, such as rivets, 74. Brace, 71, is preferably channel-shaped in cross section and a block, 75, is housed within the channel and secured to the brace, 71, constituting a spacer between the panel, 58, and said brace. A top iron, 76, extends through an opening in the panel, 58, through the spacing block, 75, and the brace, 71. A shoulder, 77, on the top iron engages the outer surface of the panel, 58, and the top iron is held clamped in this position by the nut, 78, screwed on its inner end and engaging the brace, 71, (see Fig. 23). A similar construction is used for the fender iron, 80, which supports the fender or mudguard. The block, 79, is housed within the channel brace, 71, and secured thereto and the fender iron, 80, has a threaded shank which passes through an opening in the side of the panel, 58, block, 79, and the brace, 71. The shoulder, 81, engages the outer surface of panel, 58, and the nut, 82, screwed on the threaded shank and engages the brace, 71, holding the iron clamped in position.

The rear edge of the side panel, 58, is flanged inwardly, at 83, for convenience in connecting the side unit to the unit forming the rear of the tonneau, and the web of T-bar, 164, is secured thereto. The horizontal web of the angle member forming the garnish rail, 66, is extended, at 84, beyond the rear edge of the side panel, 58, so as to be connected to a similar garnish rail on the rear unit. The bracket, 16, is connected to the rear end of the body sill member, 10, and has a laterally-projecting portion, 85, which is adapted to be connected to a side member of the chassis frame of the automobile, and an upturned flange, 86, at its rear end, adapted to be connected to the cross member of the rear unit, which will be described presently. An ear, 87, is bent upwardly from the rear end of the flange, 12, of the sill member, 10, and portions of the rear seat unit are to be connected to this ear, as I will describe hereinafter.

The complete body comprises two similar side units, one for the right hand and the other for the left hand side of the body. Both of these units may be provided with front and rear door openings or the door openings may be provided in one of the units and the side panel used to fill in the corresponding space on the other unit. In the body illustrated, both units have rear door openings, but the left-hand unit has no front door opening, the panel, 25, being carried over the door posts, 31 and 37, at 160, as I have already described. It is to be observed that these side units embody both portions of the skeleton frame and portions of the body shell. Thus the sill and the door posts and toeboard support rigidly secured thereto may be considered a part of the skeleton frame of the complete body, which takes the stresses and strains coming upon the body in use, while the side panels, 25, 55 and 58, form part of the body shell which gives external appearance to the body.

The cowl structure is to be completed by the addition of a unit forming the top of the cowl and secured to the forward ends of the side units. This unit is illustrated in Fig. 8. It consists of a sheet metal panel, 90, which is shaped to the contour necessary to form the top portion of the cowl and has a downwardly-extending flange, 91, at its forward edge, to stiffen the structure. Beads, 92, are formed in the panel, 90, adjacent its side edges, in order to stiffen and reinforce the same. These beads correspond to similar beads on the upper edges of the cowl portions of panels, 25. The rear edge of the panel, 90, is flanged upwardly and an angle bar, 93, is secured to the lower surface of the panel, 90, at said flanged edge, as shown in Figs. 4 and 8. A channel-shaped reinforcing strip, 94, embraces and is secured to said flanged edge and the angle, 93, for the purpose of reinforcing and strengthening the rear edge portion of the unit. The panel is so reinforced and strengthened that it will retain its shape notwithstanding it may be subjected to severe handling.

The portions of the side units between the door openings are connected by a front seat unit and a front heelboard unit. The front seat unit is illustrated in Figs. 9 and 29 and comprises a sheet metal panel, 101, which is pressed to form the back of the front seat. The upper edge of this panel has a bead, 102, formed therein and a forwardly-extending flange, 118, to which an angle member, 103, forming a garnish rail, is rigidly secured by welding or otherwise. The side portions of the panel, 101, are flanged outwardly, at 104, and a reinforcing strip, 105, is rigidly secured, by welding or otherwise, to the outwardly-flanged portions, 104. The side portions, 100, of the panel, 101, extend forwardly from the upper ends of flanges, 104. The bead, 106, is formed in the panel, 101, to stiffen and strengthen the same. The transversely-extending bead, 107, is formed in the panel, 101, near its lower edge, and the lower portion of the panel is bent forwardly forming the flange, 108, to which is rigidly secured, by welding or otherwise, a cross member, 110, forming a support for the rear of the front seat. This cross member has a flange, 109, inclined rearwardly and downwardly and applied and secured to the flange, 108, of the panel, 101. This member, 110, is bent into shape to form, substantially, a channel in cross section the walls of which are the inclined portions 109 and 111 and has a vertical flange, 112, the lower edge of which is bent horizontally, at 113, and to which an angle bar, 114, is secured to stiffen the construction. The pressed metal members, 115, forming the side rails of the seat, are rigidly secured, by welding or otherwise, at 118, to the flange, 109, of the cross member, 110. These side rails have flanges, 117, at their outer edges, to retain the seat cushion in position, and have longitudinally-extending beads, 116, formed therein, to add strength to the construction.

The front seat unit is such that it lends itself particularly well to compact packing for shipment. The shape of the panel, 101, and the cross-member secured to the lower edge of the panel stiffens the unit so that it is strong and retains its shape under the stresses to which it is subjected in handling and shipment.

The front heelboard unit is illustrated in Figs. 12 and 30. The heelboard, 120, is a sheet metal panel which has the beads, 121 and 122, formed therein to stiffen and strengthen it and is provided with a forwardly-extending flange, 123, at its upper edge, which supports the front edge of the seat cushion and is inclined to correspond with the inclination of the side rails, 115, and the flange, 109, of the front seat unit. A cushion-retaining member, 125, is bent into the form of an angle and has a flange, 124, rigidly secured, by welding or otherwise, to the flange, 123, of the heelboard. A flange, 126, extends forwardly from the lower edge of the heelboard and is offset, at 128, so as to provide the ledge, 127, at its forward edge, on which the floor boards 14, may rest. This unit is a panel which is substantially flat and hence gives practically the maximum economy in storage and shipment.

The rear portions of the side units are to be connected by a rear seat unit and a unit forming the rear of the tonneau. The rear seat unit is illustrated in Figs. 11, 31 and 32. It comprises a sheet metal heelboard panel, 130, having the beads, 131, formed therein, to stiffen and strengthen the same, and having a flange, 132, at its forward edge, adapted to support the front edge of the rear seat cushion. A cushion-retaining strip, 134, has a flange, 133, rigidly secured, by welding or otherwise, to the flange, 132, of the heelboard panel. A flange, 135, is bent forwardly at the lower edge of the heelboard. This flange is rigidly secured, by welding or otherwise, to the forward edge of the seat pan, 136, which is upwardly offset, at 137, and has a rear portion, 138, which is rigidly secured to the flange, 140, formed on the lower edge of the rear cross member, 139, which serves as a support for the rear portion of the seat cushion.

The cross member, 139, has a flange, 141, at its upper edge, which is bent to conform to the inclination or slope of the flange, 132, on the heelboard, and has a marginal flange, 142, for retaining the rear seat cushion in position. The side members, 143, are connected at their forward ends, to the heelboard panel, 130, and at their rear ends, to the cross member, 139. The heelboard panel, 130, rear cross member, 139, and side members, 143, are rigidly connected together to form a box-like structure which is adapted to support the seat cushion. Each of said side members has a flange, 144, turned inwardly from its lower edge for a purpose which will be described hereinafter. The flange, 145, at the upper edge of each side member, forms a support for the side of the seat cushion and the upwardly-extending flange, 146, serves to retain the cushion in place. Openings, 147, are formed in the side members, 143, to receive the ends of a cross board which is used to assist in supporting the rear seat cushion. Cutouts 148, may be formed in the side members, 143, if desired, to lighten them and facilitate the welding of the parts of the unit. The rear seat unit is particularly compact inasmuch as it is a box-like structure of such a nature that such units may be stacked one upon the other, in shipment. The unit is so reinforced that it is very strong and can withstand the rough handling to which it is likely to be subjected in shipment.

The unit forming the rear of the tonneau includes a panel, 149, which forms the rear portion of the body shell. This panel is flanged inwardly at its sides, at 150, and the reinforcing angle members, 151, are rigidly secured, by welding or otherwise, to said flanges. A bead, 152, is formed at the upper edge of the panel, 149, and said upper edge is bent forwardly forming the flange, 153, to which the strip, 154, is secured, to strengthen and reinforce this part of the unit. The lower edge portion of the panel, 149, is bent forwardly forming a flange, 155, which is applied and rigidly secured, by welding or otherwise, to the lower flange of the channel cross member, 156, which is arranged with its open side facing away from the panel, 149. The flanges, 157, are bent rearwardly from the base of the channel, 156, and rigidly secured, by welding or otherwise to the lower ends of the flanges, 150, and the reinforcing angles, 151. The unit forming the rear of the tonneau is substantially flat and many of these units may be shipped or stored in a comparatively small space. The angle members secured to the edge portions of the panel reinforce and strengthen the unit so that it will retain its shape under rough handling.

The various body units which I have described are to be manufactured independently and then assembled and connected together to form the complete body. The side units are placed in the proper relation to each other and may, if desired, be held in such relation, during the assembly of the other units, by means of a suitable jig or fixture. The unit forming the top of the cowl is mounted on the forward ends of the side units and is connected thereto, as shown in Figs. 3 and 4. The channel-shaped braces, 95, each have a laterally-extending foot, 96, at their forward end, which is riveted, as at 97, to the flange, 91, of the panel, 90. The rear end 98, of each brace, is riveted, at 99, to the panel, 90, and, at 99', to the upper end of the door post, 31, of the corresponding side unit. In this manner, the unit forming the top of the cowl is connected to both the forward ends of the side units. The rivets, 99 and 99', by which the rear ends of the braces, 95 are connected, are customarily concealed by the brackets (not shown) for supporting the windshield. The ends of the heelboard panel, 120, and the cushion retaining member, 125, thereon, are secured, in any suitable manner, to the inturned flanges of the door posts, 37, of the side units. The forwardly-extending flange, 126, of said heelboard, forms a part of the floor of the body, supplementing the floor boards, 14, supported by ledges, 13 and 127. The front seat unit is positioned between the side units with the ends of the angle bar, 114, resting on and secured to the flanges, 11, of the sill members, and the strips, 105, which are applied and secured to the flanges, 104, of the panel, 101, resting against and secured to the inturned flanges of the door posts, 47. Referring to Fig. 9, it will be noted that there are portions, 100, of the front seat panel, 101, which extend forwardly from the upper ends of the flanges and strips, 104 and 105. These portions rest on the upper ends of the door posts, 47, and the adjacent portions of the side units and are connected to said side units, as shown in Fig. 16, by angle members, 45. The vertical flange of the garnish rail, 103, is connected in any suitable manner, for instance, by the rivets, 168, to the vertical flange of the angle member, 45. The horizontal flange of the angle member, 45, is connected, for instance, by welding to the flange, 44, at the upper edge of the side panel, 25, between the door openings. The said horizontal flange of the angle member, 45, is also extended rearwardly, at 48, and provided with a down-turned foot, 49, which is secured, by rivets or otherwise, to the upper end of door post, 47. The forward ends of the side rails, 115, on the front seat unit are connected to the flange, 123, of the front heelboard unit, in any suitable manner. The vertical flanges, 104, at the sides of the panel, 101, are secured by bolts or rivets, or any other suitable means, to door posts, 47.

The rear portions of the side units are connected by the unit forming the rear of the tonneau and the rear seat unit. The channel-shaped cross member, 156, of the former unit, fits between the rear ends of the body sills and is connected to the projecting ears, 86, of the brackets, 16, (see Fig. 5). The in-turned flanges, 83, at the rear edges of the side panels, 58, and the webs of the T-bars, 164, which may form part of the side units, fit against the flanges, 150, of the rear tonneau panel, 149, and bolts, 168, extend through said flanges and the reinforcing angle, 151, to connect these units together, (see Fig. 28). The flanges, 84, projecting from the garnish rails, 66, on the side units, are connected, in any suitable manner, to the ends of the garnish rail, 154, of the rear tonneau unit.

The rear seat unit is positioned between the rear portions of the side units with the heelboard panel, 130, about in line with the front edges of the door posts, 60. The flanges 144, of the side members of the rear seat unit rest upon and are secured to the upper flanges of the channel members 70, forming part of the side units. The rear cross member, 139, of the rear seat unit is secured in any suitable manner to the ears, 87, extending upwardly from the rear ends of the body sills. The sides of the forward portion of the seat pan, 136, rest on and are secured to the flanges, 11, of the body sills, while the side edges of the heelboard, 130 forming part of the rear seat unit, and the ends of the cushion retaining member, 134, are secured to the inwardly-extending flanges of the door posts, 60, of the side units. The upright flanges of the angle members, 200, fastened on the sills near their rear ends, are bent over the side edges of the rear portion, 138, of the seat pan to assist in holding the rear seat unit in place.

The several units which go to make up the complete body may be manufactured independently with considerable economy because they are comparatively small in size. They are of such shape that they can be shipped and stored very compactly. The operations which are necessary to assemble and connect such independent units, in completing the body, are relatively simple and inexpensive and such that they do not require any elaborate tools or equipment. Consequently, these several body units may be manufactured by a body manufacturer and shipped as units to the automobile plant, or assembly point, for assembling into a complete body. This is a feature which presents several distinct advantages both in economy of manufacture and economy of transportation. Furthermore, in case of any injury to one of the units, it may be removed and a new unit substituted with very little trouble, thus reducing some of the inconveniences and difficulties usually attendant upon repairing damage to a body such as may be caused by a collision, for instance.

The sill construction shown in this application is one which is very strong but very economical to manufacture. It has the advantages of a straight sill construction and is made up of members which can be formed without the necessity for expensive dies. This sill construction may be used in bodies which do not have the unit construction disclosed herein and, consequently, I have claimed this sill construction broadly, without restricting it to the unit construction disclosed. I have shown a door post construction which is relatively inexpensive to manufacture, since the door posts are relatively straight angle members which do not require elaborate dies for their production. This door post construction, the connection between the door posts and the sill, and the gusset plate for forming the corners of the door openings, will be found useful in other body constructions, and, therefore, I have claimed such constructions broadly, without limiting them to the unit body construction disclosed. The same is true of various other features of this body, as will be apparent from the specifications and claims.

I am aware that the body construction illustrated and described in this application may be changed considerably, without departing from the spirit of my invention, and, therefore, I claim my invention broadly, as indicated by the appended claims.

Having thus described my invention, what I claim as new and useful and desire to secure by Letters Patent is:

1. A metal body for automobiles comprising a pair of independently-assembled side units, each including a longitudinally-extending angle member forming a body sill member, a plurality of vertically-extending angle members forming door posts and rigidly secured to said sill member, and side panels rigidly secured to said sill member and door posts and forming the side of the body from the front of the cowl to the rear of the tonneau, said side panels having one or more door openings formed therein, a panel connecting forward portions of said side units and forming the top of the cowl, a front seat unit having portions extending over and secured to the upper portions of said side units in front of the rear door openings and portions rigidly secured to the door posts in front of said rear door openings, and a rear seat unit connecting rear portions of said side units.

2. A metal body for automobiles comprising a pair of independently-assembled side units, each including a longitudinally-extending angle member forming a body sill and having an up-turned ear at its rear end, and side panels rigidly secured to said sill and forming the side of the body from the front end of the cowl to the rear of the tonneau, and a rear seat unit connecting rear portions of said side units and rigidly connected to the upturned ears of said body sills.

3. A metal body for automobiles comprising a pair of independently-assembled side units, each including a longitudinally-extending angle member which is straight from end to end, a channel member curved to conform to the contour of the lower side portion of the body and having its upper flange rigidly secured to an upper flange of said angle member, spacing strips connecting lower flanges of said channel member and said angle member, and side panels applied externally and rigidly secured to said channel member and forming the side of the body from the front of the cowl to the rear of the tonneau.

4. A metal body for automobiles comprising a pair of independently-assembled side units, each including panels forming the side of the body from the front of the cowl to the rear of the tonneau, a panel shaped to form the top of the cowl and flanged at its rear edge, an angle-reinforcing member secured to the rear edge portion of said panel, a channel-shaped reinforcing strip embracing the oppositely-extending flanges of said panel and angle member, the side portions of said panel being rigidly secured to the forward portions of said side unit.

5. A metal body for automobiles comprising a pair of independently-assembled side units, each including panels forming the side of the body from the front of the cowl to the rear of the tonneau, a panel shaped to form the top of the cowl and provided with a downwardly-extending flange at its front edge, and a pair of braces extending longitudinally of the cowl, one at each side thereof, the forward ends of said braces being secured to the downwardly-extending flange of said panel and the rear ends of said braces being secured to the rear corners of said panel and to said side units.

6. A metal body for automobiles comprising a pair of independently-assembled side units, each including side panels provided with one or more door openings and forming the side of the body from the front of the cowl to the rear of the tonneau, and a plurality of door posts, the upper edges of the side panels in front of the rear door openings each having a laterally-extending flange, a sheet metal panel shaped to form the back of a front seat and having its side portions rigidly connected to the door posts in front of the rear door openings, said front seat panel having forwardly-extending portions disposed over the upper edges of the said units in front of the rear door openings, the tops of which portions are aligned with the laterally-extending flanges on the side units, and angular members connected to the flanges at the upper edges of the side units and the forwardly-extending portion of said front seat panel, for rigidly securing these parts together.

7. A metal body for automobiles comprising a pair of independently-assembled side units, each including side panels provided with one or more door openings and forming the side of the body from the front of the cowl to the rear of the tonneau, and a plurality of door posts, the upper edges of the side panels in front of the rear door openings having a laterally-extending flange, a sheet metal panel shaped to form the back of a front seat and having its side portions rigidly connected to the door posts in front of the rear door openings, said front seat panel having forwardly-extending portions disposed over the upper edges of the said units in front of the rear door openings, and angle members connected to the flanges at the upper edges of the side units and to the forwardly-extending portions of said front seat panel, said angle members each having a rearwardly-extending foot rigidly connected to the adjacent door post in front of the rear door opening.

8. A metal body for automobiles comprising a pair of independently-assembled side units, each including a longitudinally-extending body sill, panels forming the side of the body and a bracket secured to the rear end of said sill and adapted to be connected to the chassis frame of the automobile, and a unit connecting the rear portions of said side units and including a cross member having its ends rigidly connected to said brackets and a sheet metal panel applied externally to and rigidly secured to said cross member and forming the back of the rear seat.

9. A metal body for automobiles comprising a pair of independently-assembled side units, each including a longitudinally-extending body sill, panels forming the side of the body and a bracket secured to the rear end of said sill and adapted to be connected to the chassis frame of the automobile, and a unit connecting the rear portions of said side units and including a channel cross member rigidly connected to the rear ends of said sills and having rearwardly extending flanges at its ends and a sheet metal panel shaped to form the back of the rear seat, said panel having its lower edge flanged forwardly and secured to the lower surface of said channel and its side portions flanged forwardly and rigidlly secured to the flanges extending rearwardly from the ends of said channel.

10. A metal body for automobiles comprising a pair of independently-assembled side units, each including panels forming the side of the body, and garnish rails rigidly secured to the upper edges of said panels and projecting from the rear end thereof, and a unit connecting the rear portions of said side units and including a panel shaped to form the back of the rear seat and a garnish rail fastened to the upper edge of said panel, said last-mentioned garnish rail being rigidly connected to the portions projecting rearwardly of the garnish rails of the side units.

11. A metal body for automobiles comprising a pair of independently-assembled side units, each including a longitudinally-extending body sill and panels forming the side of the body, and a rear seat unit connecting the rear portions of said side units and including a heelboard, rear cross member and side members connected together to form a box-like structure for supporting the rear seat cushion, said side members having laterally-extending flanges supported by and secured to said body sills.

12. A metal body for automobiles comprising a pair of independently-assembled side units, each including panels forming the side of the body, a longitudinally-extending body sill and a channel member resting on its side on and secured to said sill near the rear end thereof, and a rear seat unit connecting rear portions of said side units and consisting of a box-like structure for supporting the rear seat cushion including side members having laterally-extending flanges resting on and secured to said channel members.

13. A metal body for automobiles comprising a pair of independently-assembled side units, each including a longitudinally-extending body sill, having an upwardly-extending ear at its rear end, and panels forming the side of the body, and a rear seat unit connecting rear portions of said side units and consisting of a box-like structure for supporting the rear seat cushion including a rear cross member secured to the upwardly extending ears on said body sills.

14. A metal body for automobiles comprising a pair of independently-assembled side units, each including a longitudinally-extending body sill, panels forming the side of the body and an angle member secured to each of said sills, and a rear seat unit connecting rear portions of said side units and consisting of a box-like structure for supporting the rear seat cushion including a seat pan having portions projecting laterally and resting upon the upper surfaces of said sills, the vertical flanges of said angle members being bent over such portions of the seat pan to hold the rear seat unit in place.

15. A metal body for automobiles comprising a substantially straight, longitudinally-extending pressed metal member having a vertical web and oppositely-extending flanges at the upper and lower edges thereof, a channel member extending longitudinally of the unit and curved to conform to the contour of the lower portion of the body, said channel being arranged with its open side facing inwardly and its upper wall secured to the upper flange of said pressed metal member, spacing members fastened to the lower wall of said channel and the lower flange of said pressed metal member, and panels forming the side of the body from the front of the cowl to the rear of the tonneau, applied externally to the base of said channel and rigidly secured to the lower wall thereof.

16. A body for automobiles comprising a longitudinally-extending angular body sill member, a bracket secured to the forward end of said sill and having a lateral extension adapted to be connected to the chassis frame of the automobile, a panel secured to said sill member and forming the side of the cowl, a vertical angle member secured to said bracket and to the front edge of the panel forming the side of the cowl.

17. An independently-assembled side unit for automobile bodies comprising a longitudinally-extending angle body sill member, panels secured to said sill member and forming the side of the body and an angle member secured to said sill member near the rear end thereof and provided with a vertical flange adapted to be bent over the edge of a seat pan.

18. An independently-assembled side unit for automobile bodies comprising a longitudinally-extending angle sill member provided at its rear end with an ear bent laterally and adapted to be connected to parts of a rear seat unit, and panels forming the side of the body secured to said sill member.

19. A body for automobiles comprising a longitudinally-extending angle body sill member, vertical angle members secured to said sill and forming door posts, paneling secured to said sill member and door posts and forming the side of the tonneau, a garnish rail secured to the upper edge of the panel forming the side of the tonneau, and a top-supporting iron secured to one of said door posts and to said garnish rail and projecting laterally over the top edge of the tonneau.

20. A sheet metal body for automobiles comprising a sheet metal panel pressed to the desired contour to form the top of the cowl and having a downwardly-extending flange at its forward edge, the rear edge of said panel having a flange formed thereon, a reinforcing angle secured to the rear edge of said panel with a web extending oppositely to said flange, and a channel member embracing said web and said flange.

21. An independently-assembled unit for automobile bodies comprising a sheet metal panel pressed to the desired contour to form the back of a seat, said panel having vertical flanges at the sides thereof and side portions extending forwardly from the upper ends of said flanges, a channel cross member having a flange at its upper edge shaped to support the rear of the seat cushion, the lower edge of said panel being rigidly secured to said flange, and a pair of side rails, for supporting the sides of the seat cushion, rigidly secured to said flange near the ends thereof and extending forwardly therefrom.

22. An independently-assembled unit for automobile bodies comprising a panel pressed to the desired contour to form the rear of the tonneau and having its edges flanged inwardly, and an angular-in-section cross member rigidly secured to the flange at the lower edge of said panel and provided with rearwardly-extending flanges secured to the flanges at the sides of said panel.

23. In an automobile body, the combination of a substantially straight angle member extending longitudinally of the body and having an outwardly-extending flange at its upper edge, a channel member curved to conform to the contour of the lower portion of the body and disposed on its side with its upper flange secured to said flange of the angle member, and a side panel applied to the outer surface of the base of said channel and having a flange at its lower edge applied externally and secured to the lower flange of said channel.

24. In an automobile body, the combination of a substantially straight angle member extending longitudinally of the body and provided with an outwardly-extending flange at its upper edge and an inwardly-extending flange at its lower edge, a channel curved to conform to the curvature of the lower portion of the body and rigidly secured to the upper flange of said angle member, a plurality of spacers secured to the lower flanges of said angle and channel members, and a side panel applied externally to said channel member and rigidly secured thereto.

25. In an automobile body, the combination of a pressed metal body sill extending longitudinally of the body, a vertical angle member secured to said sill and forming a door post, portions of said sill and angle member being offset adjacent their connection, a side panel applied externally to said sill and door post, and a plate disposed between said panel and the offset portions of said sill and door post and secured to said sill and door post.

26. In an automobile body, the combination of a pressed metal sill extending longitudinally of the body, a vertical angle member forming a door post and having a flange bent laterally at its lower end and secured to said sill, a side panel applied externally and secured to said sill and door post and a plate disposed between said panel and the sill and door post and rigidly secured to both said sill and said door post.

27. In an automobile body, the combination of a pair of pressed metal sills, vertical angle members forming door posts and connected to said sills, a pair of vertical cowl reinforcing members also connected to said sills, panels pressed to shape to form the sides of the cowl and applied externally and rigidly secured to said sills and vertical members, a sheet metal panel pressed to shape to form the top of the cowl, and a pair of channel-shaped braces having their forward ends secured to a flange at the forward edge of the top panel and their rear ends secured to the rear corners of said panel and the upper ends of said door posts.

28. In an automobile body, the combination of a pair of pressed metal sills extending longitudinally of the body, channel members positioned on their sides on said sills and fastened thereto, and a seat-supporting structure including side members having flanges resting upon and secured to said channel members.

29. In an automobile body, the combination of a pair of pressed metal body sills extending longitudinally of the body, a cross member connecting the rear ends of said sills and a seat-supporting structure including a pressed metal seat pan having its rear portion offset upwardly and resting upon the upper surface of said rear cross member.

30. In an automobile body, the combination of a pair of pressed metal sills extending longitudinally of the body and having inwardly-extending flanges at their lower edges, a cross member connecting the rear ends of said sills, and a seat-supporting structure including a heelboard having its lower edge resting on and secured to said sill flanges, and a seat pan resting on said sill flanges and having its rear portion offset upwardly and resting upon the upper surface of said cross member.

31. In an automobile body, the combination of a pair of pressed metal sills extending longitudinally of the body and having upwardly-extending ears at their rear ends, and a seat-supporting structure secured to said sill and including a pressed metal member formed to provide a support for the rear edge of the seat cushion and connected with the upwardly-extending ears of said sills.

32. In an automobile body, the combination of a pair of pressed metal sills extending longitudinally of the body, panels secured to said sills and forming the sides of the tonneau, reinforcing angles secured to the upper edges of said panels, a pair of brace members, one at each side of the body, having feet resting on and secured to said sills and their upper ends secured to said reinforcing members, and supporting iron extending through said panels and connected to said brace members.

33. A metal body for automobiles comprising a pair of independently-assembled side units each including a longitudinally-extending angle member having an outwardly-extending flange at the top thereof, a channel member lying on its side and secured to the top flange of said angle member through its upper side and curved to conform to the contour of the lower side portion of the body, and side panels rigidly secured to said channel member and forming the side of the body from the front of the cowl to the rear of the tonneau.

34. In an automobile body, a pressed metal body side sill of inverted channel shape in cross section and extending through and beyond the thresholds of the doors, and having its inner side substantially straight, and its outer side curved to conform to the contour of the lower side portion of the body, the bottom wall of said channel-shaped sill forming the thresholds of the doors.

35. In an automobile body, a pressed metal body side sill structure of inverted channel shape in cross section, said inverted channel structure extending through and beyond the thresholds of the doors and being built up of two longitudinal members, one forming the inside wall of the channel and the other the outside wall of the channel, said members being joined together in the bottom wall of the channel which forms the thresholds of the doors.

36. In an automobile body, a pressed metal body side sill of substantially inverted channel shape in cross section extending through and beyond the threshold of a door, the bottom wall of said channel shaped sill forming the threshold of the door, its outer wall conforming substantially throughout its length to the contour of the lower side portion of the body, and its inner wall being formed with a rabbet to receive the edge of a floor board.

37. In an automobile body, a pressed metal body side sill structure of inverted channel shape in section extending through and beyond the thresholds of the doors and comprising an inner longitudinal member having an outwardly extending flange, the outer edge of which conforms to the contour of the lower portion of the body, and an outer member having an inwardly extending flange and curved to conform to the contour of the lower portion of the body, said members being rigidly connected together by direct connection between said flanges, said flanges forming a reinforced bottom wall of the inverted channel sill structure which serves to provide the thresholds of the doors.

38. A toe-board support for vehicle bodies comprising a pressed metal member having a vertically extending arm having a rearwardly and downwardly inclined upper edge, and an outwardly extending arm secured to the inclined edge of said vertically extending arm, through a portion angular in section and forming a rabbet to receive the edge of a toe-board.

39. A metal body for automobiles comprising a pair of independently assembled side units, each including a longitudinally extending member forming a body sill and side panels forming the side of the body, an independently assembled front seat-unit including a panel shaped to form the back of a front seat, a cross member resting upon said body sills and supporting the lower edge of said seat back panel, and a pair of forwardly extending side rails rigidly secured to and supported by said cross member, and a unitary front seat heel-board panel making unit joints with said independently assembled side units and the fore ends of said rails.

40. In an automobile body, the combination of a pair of longitudinally extending flanged members secured together by directly connecting their flanges to constitute a body sill, one of said members conforming to the contour of the lower side portion of the body and having a side panel applied externally and rigidly secured thereto, and a plurality of brackets fastened to the other of said members and adapted to be connected with the chassis frame of the automobile.

41. In an automobile body, the combination of a sill extending longitudinally of the body, a bracket secured to the forward end of said sill and having a portion extending forwardly thereof, a vertical reinforcing member secured to the forwardly extending end of said bracket, and a cowl panel applied externally and rigidly secured to said sill and vertical member.

In testimony whereof, I affix my signature.

JOSEPH LEDWINKA.